US010621811B2

(12) United States Patent
Tovey et al.

(10) Patent No.: US 10,621,811 B2
(45) Date of Patent: Apr. 14, 2020

(54) SYSTEM AND METHOD FOR STORING THIRD PARTY ITEMS AT AUTOMATED LOCKER

(71) Applicant: Walmart Apollo, LLC, Bentonville, AR (US)

(72) Inventors: David Tovey, Rogers, AR (US); Todd Mattingly, Bentonville, AR (US); Bruce Wilkinson, Rogers, AR (US); Robert Armstrong, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/386,860

(22) Filed: Apr. 17, 2019

(65) Prior Publication Data

US 2019/0325691 A1 Oct. 24, 2019

Related U.S. Application Data

(60) Provisional application No. 62/660,021, filed on Apr. 19, 2018.

(51) Int. Cl.
*G07F 17/12* (2006.01)
*A47G 29/14* (2006.01)
(Continued)

(52) U.S. Cl.
CPC ......... *G07F 17/12* (2013.01); *A47G 29/141* (2013.01); *G06Q 10/0875* (2013.01);
(Continued)

(58) Field of Classification Search
CPC . G07F 17/12; A47G 29/141; A47G 2029/145; A47G 2029/146;
(Continued)

(56) References Cited

U.S. PATENT DOCUMENTS 6,010,239 A * 1/2000 Hardgrave ............... G07F 7/00
700/213
8,626,614 B2 * 1/2014 Barber ................ G06Q 10/087
705/28
(Continued)

FOREIGN PATENT DOCUMENTS

CA 3018452 A1 9/2017
CN 103148804 A 6/2013
(Continued)

OTHER PUBLICATIONS

Ben Cresitello-Dittmar, "Application of the Blockchain for Authentication and Verification of Identity", Nov. 30, 2016, pp. 1-9.
(Continued)

*Primary Examiner* — Thomas D Alunkal
(74) *Attorney, Agent, or Firm* — Venable LLP; Jeffri A. Kaminski

(57) ABSTRACT

Systems for storing items in customer-owned product storages at an automated locker are provided. An example system can include: an automated locker comprising a plurality of product storages and a three-dimensional (3D) point cloud scanner; a platform, wherein the platform comprises: a processor; and a non-transitory computer-readable storage medium having instructions stored which, when executed by the processor, cause the processor to perform operations comprising: receiving a request from a customer to rent a product storage located in one of a plurality of automated lockers; assigning the product storage to the customer; selecting a payment method by the customer and confirming a payment transaction; issuing a verification code to the entity to retrieve the item; automatically retrieving the first item from the product storage; and processing, via the 3D point cloud scanner, a return request from the customer.

20 Claims, 7 Drawing Sheets

(51) Int. Cl.
*G06Q 10/08* (2012.01)
*G07C 9/00* (2020.01)
*G06Q 30/02* (2012.01)
*G06Q 30/06* (2012.01)

(52) U.S. Cl.
CPC ..... *G06Q 30/0278* (2013.01); *G06Q 30/0623* (2013.01); *G07C 9/00309* (2013.01); *G07C 9/00912* (2013.01); *A47G 2029/145* (2013.01); *A47G 2029/146* (2013.01)

(58) Field of Classification Search
CPC ........... G06Q 10/0875; G06Q 30/0278; G06Q 30/0623; G06Q 10/083; G07C 9/00309; G07C 9/00912; G06K 9/62
See application file for complete search history.

(56) References Cited

U.S. PATENT DOCUMENTS

| | | | | |
|---|---|---|---|---|
| 8,854,184 | B2* | 10/2014 | Mullin | G07C 9/00142 340/5.7 |
| 9,749,140 | B2* | 8/2017 | Oberhauser | H04L 9/3247 |
| 2014/0132728 | A1* | 5/2014 | Verano | G06K 9/00771 348/46 |
| 2015/0088694 | A1* | 3/2015 | Ackerman | G06Q 10/087 705/26.62 |
| 2015/0356801 | A1* | 12/2015 | Nitu | G07C 9/00912 340/5.61 |
| 2016/0123722 | A1* | 5/2016 | Chang | G01B 11/06 702/172 |
| 2016/0255969 | A1* | 9/2016 | High | G05D 1/0027 |
| 2016/0258762 | A1* | 9/2016 | Taylor | G06K 9/00671 |
| 2017/0185849 | A1* | 6/2017 | High | B64C 39/024 |
| 2018/0060800 | A1* | 3/2018 | Robinson | G06Q 10/083 |

FOREIGN PATENT DOCUMENTS

| | | |
|---|---|---|
| CN | 107248237 A | 10/2017 |
| WO | 2013148123 A1 | 10/2013 |
| WO | 2017066002 A1 | 4/2017 |

OTHER PUBLICATIONS

RedGirraffe, "RentPay™: now paying rent gets rewarding", pp. 1-11.
Rob Marvin, "Blockchain: The Invisible Technology That's Changing the World", PC Mag, Aug. 30, 2017, pp. 1-30.
International Search Report and Written Opinion dated Jul. 29, 2019, issued in corresponding PCT Application No. PCT/US2019/27837.

* cited by examiner

SYSTEM AND METHOD FOR STORING THIRD PARTY ITEMS AT AUTOMATED LOCKER

This patent application claims the benefit of U.S. Provisional Application No. 62/660,021, filed on Apr. 19, 2018, content of which is incorporated by reference herein.

BACKGROUND

1. Technical Field

The present disclosure relates to product storage at an automated locker, and more specifically to storing customer's items at an automated locker.

2. Introduction

With the fast growth of the Internet and e-commerce services, more and more customers prefer to make online orders remotely for products via a merchant's e-commerce website using their mobile devices. Automated lockers (e.g. kiosks, towers) have been used for customers to pick up their online orders. Generally, products customers have purchased are stored or are delivered to an automated locker once the customers place their online orders via a merchant's website. For example, customers may browse the merchant's e-commerce website, order products, select an automated locker for pickup, and pay electronically via their mobile devices. The customers no longer need to wait for their purchased products to be delivered to their doorstep. Rather, they simply receive a text message or an email via their mobile devices that their packages are ready for pickup from the automated locker. Upon arriving at the locker, which is presumably near their everyday route, they type or scan their pickup codes, and the purchased products can be quickly retrieved from the automated locker.

However, the currently existing automated lockers can be improved to fulfil needs of a wide variety of customers. For example, when customers want to return products, they still need to return the products to one of merchant's physical stores or ship them back to the merchant according to online order return policies. In addition, there may be excess capacity at lockers that can be leveraged. Customers may use the locker for storage, such as to store products that are rented and returned. Therefore, there is a need to provide additional capabilities at automatic lockers to make customer's e-commerce experience more convenient and to make more efficient use of the lockers.

What is provided herein are systems and methods for storing items in customer-owned product storages at automated locker, which may overcome some aspects of disadvantages of an existing locker.

SUMMARY

An example method of performing concepts disclosed herein can include: receiving, via a processor at a platform, a request from a customer to rent a product storage located in one of a plurality of automated lockers of the platform, each of the plurality of automated lockers comprising a plurality of product storages; assigning, by the processor, to the customer, based on a customer's profile, a product storage in an automated locker, the automated locker being selected by the customer; receiving, via the processor, a purchase request from the customer for purchasing a first item from the platform or from a retailer's website outside the platform; selecting, via the processor, an entity to pick up the first item from the automated locker; selecting, via the processor, a payment method and confirming a payment transaction, the payment method being one of a credit card transaction, debit card transaction and a blockchain payment transaction; delivering, via a distribution network, the first item to the assigned product storage; issuing, via the platform, a first verification code to the entity for picking up the first item; receiving, at the locker, a code from the customer's smart phone or entered by the customer via a touch screen interface at the locker; verifying, via the processor, at the locker, that the code from the customer corresponds to the first verification code issued to the customer; automatically retrieving the first item from the product storage to the customer; and processing, via a three-dimensional (3D) point cloud scanner, a return request from the customer for returning a second item to the assigned product storage, the 3D point cloud scanner comprising a scanning module, a processing module, and an output module.

An example system configured according to the concepts and principles disclosed herein can include: an automated locker comprising a plurality of product storages and a three-dimensional (3D) point cloud scanner; a platform, wherein the platform comprises: a processor; and a non-transitory computer-readable storage medium having instructions stored which, when executed by the processor, cause the processor to perform operations comprising: receiving, via a processor at a platform, a request from a customer to rent a product storage located in one of a plurality of automated lockers of the platform, each of the plurality of automated lockers comprising a plurality of product storages; assigning, by the processor, to the customer, based on a customer's profile, a product storage in an automated locker, the automated locker being selected by the customer; receiving, via the processor, a purchase request from the customer for purchasing a first item from the platform or from a retailer's website outside the platform; selecting, via the processor, an entity to pick up the first item from the automated locker; selecting, via the processor, a payment method and confirming a payment transaction, the payment method being one of a credit card transaction, debit card transaction and a blockchain payment transaction; delivering, via a distribution network, the first item to the assigned product storage; issuing, via the platform, a first verification code to the entity for picking up the first item; receiving, at the locker, a code from the customer's smart phone or entered by the customer via a touch screen interface at the locker; verifying, via the processor, at the locker, that the code from the customer corresponds to the first verification code issued to the customer; automatically retrieving the first item from the product storage to the customer; and processing, via a three-dimensional (3D) point cloud scanner, a return request from the customer for returning a second item to the assigned product storage, the 3D point cloud scanner comprising a scanning module, a processing module, and an output module.

An example non-transitory computer-readable storage medium configured as disclosed herein can have instructions stored which, when executed by a computing device, cause the computing device to perform operations including: receiving, via a processor at a platform, a request from a customer to rent a product storage located in one of a plurality of automated lockers of the platform, each of the plurality of automated lockers comprising a plurality of product storages; assigning, by the processor, to the customer, based on a customer's profile, a product storage in an automated locker, the automated locker being selected by the customer; receiving, via the processor, a purchase request from the customer for purchasing a first item from the platform or from a retailer's website outside the platform; selecting, via the processor, an entity to pick up the first item from the automated locker; selecting, via the processor, a payment method and confirming a payment transaction, the payment method being one of a credit card transaction, debit card transaction and a blockchain payment transaction; delivering, via a distribution network, the first item to the assigned product storage; issuing, via the platform, a first verification code to the entity for picking up the first item; receiving, at the locker, a code from the customer's smart phone or entered by the customer via a touch screen interface at the locker; verifying, via the processor, at the locker, that the code from the customer corresponds to the first verification code issued to the customer; automatically retrieving the first item from the product storage to the customer; and processing, via a three-dimensional (3D) point cloud scanner, a return request from the customer for returning a second item to the assigned product storage, the 3D point cloud scanner comprising a scanning module, a processing module, and an output module.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

Figure 1:
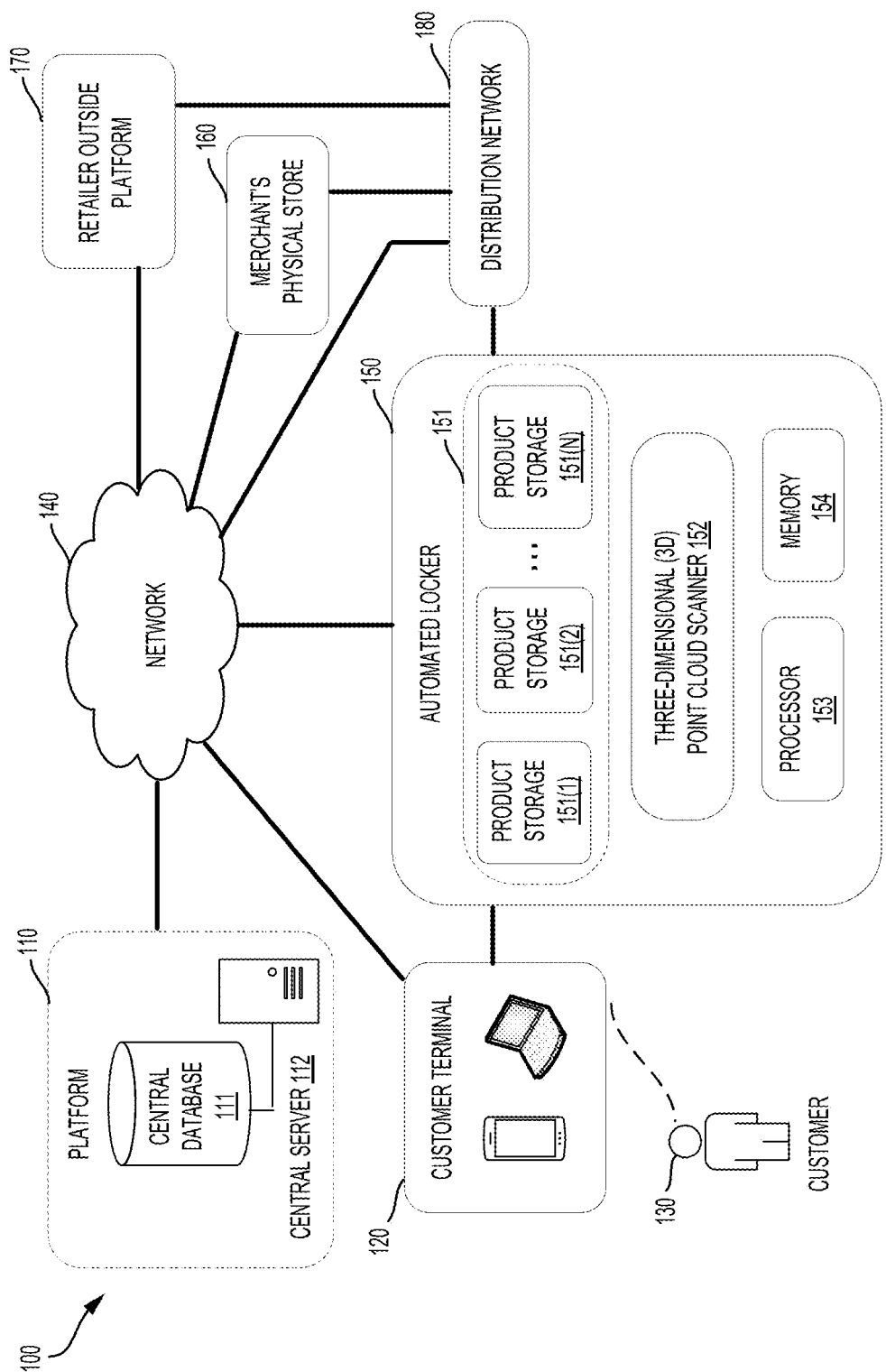
FIG. 1 is a block diagram illustrating an example computing environment in which some example embodiments may be implemented.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

Systems, methods, and computer-readable storage media provided in this disclosure are capable of enabling a customer to utilize a merchant's automated locker and store products at the merchant's automated locker for a period of time chosen by the customer. The system in the present disclosure allows the customer to return purchased items to the product storage of the locker, to authorize a third party (e.g. family members, friends or neighbors) to pick up items such as gifts directly from the product storage of the locker, and to rent items stored in the locker to a third party, etc. For example, a customer can use his rented product storage to store gifts, house keys, dish soap, and perishable food for their family members, friends or neighbors to pick up at the automated locker whenever they are available. With the customer-owned product storage, customers can pick up their orders securely stored at some convenient locations anytime.

In some example embodiments of this disclosure, a customer can also quickly return an item ordered online to the automated locker without visiting a merchant's local store or sending the item back to the merchant. Moreover, the customer may make a bulk purchase to be picked up separately or have some important personal items stored outside their homes. In addition, the system may also utilize blockchain transaction to facilitate transactions between customers and a third party via a peer to peer (P2P) network, for making those transactions more secure and convenient.

In some example embodiments of this disclosure, an automated locker is operable to assign an authorized customer an ability to rent one of a plurality of product storages at the automated locker. The automated locker is adapted to accept entry of a verification code and to permits the customer or a third party to retrieve the stored product upon entry of the unique verification code.

FIG. 1 is a block diagram illustrating an example computing environment 100 in which some example embodiments may be implemented. The example computing environment 100 generally includes one or more of platform 110, customer terminal 120, customer 130, network 140, automated locker 150, merchant's physical store 160, retailer outside merchant's platform 170, and distribution network 180. A platform 110 may communicate with an online website, a plurality of automated lockers as well as one or more retail stores to fulfill orders for one or more products and services. In this case, customer 130 may place an online order of one or more items via the merchant's website for pickup at one of a plurality of automated lockers 150.

In the example computing environment 100, customer terminal 120 may represent a mobile device such as a smartphone, a tablet computer, a notebook computer, or a desktop computer that is communicatively coupled to network 140 to allow customer 130 to communicate, access information and place orders via network 140.

Network 140 may include wired and/or wireless networks that enable communications between the various networked devices associated with example computing environment 100, such as customer terminal 120, central server 112, automated locker 150, merchant's physical store 160, retailer outside merchant's platform 170, and distribution network 180.

As shown in FIG. 1, automated locker 150 may be located in parking lots close to merchant's physical stores 160, in the store 160, local parks or other public places convenient for customers to access.

In the example computing environment 100, platform 110 may include one or more servers, shown and referred to as central server 112 for simplicity, and one or more databases, shown and referred to as a central database 111 herein for simplicity. Central server 112 and central database 111 may be communicatively coupled to receive information and data from network devices via network 140. Database 111 may record, store or otherwise contain therein data associated with a set of products and/or services that are available for sale at an e-commerce website hosted on a web server for pickup at one or more merchant's automated lockers including merchant's physical store 160.

Central server 112 may be configured to allow customers to place and pick up an online order of one or more items at automated locker 150 via network 140. Platform 110 may include one or more computing devices for communicating with automated locker 150 via network 140 to execute one or more sets of processes shown in FIGS. 2 and 3. Central server 112 may also conduct various types of payment transitions via different types of traditional payment networks related to credit and check cards and blockchain payment networks (not shown). A blockchain payment network may be coupled with network 140 via a third party service.

Customer 130 may create, via central server 112 and network 140, an account with platform 110 by creating a customer profile to store personal information and credentials of customer in central database 111. Each account profile may be configured to store data related to customer 130 including customer's username, email address, password, phone number, customer's rating, delivery (residential) address, payment transaction accounts, purchasing preference, search history, order history, information, and friend information, other relevant demographic or analytical data, third parties including family members, friends, or neighbors, etc. Central database 111 may be configured to store a plurality of account profiles. Customer's payment transaction accounts may include one or more blockchain payment transaction accounts associated with blockchain payment networks, one or more credit card or debit card accounts associated with corresponding card payment networks, and one or more mobile payment accounts linked with customer's credit card or debit card accounts.

In an example embodiment, customer 130 may update and create the customer's profile via a merchant's website, by accessing an application installed on a mobile device or by accessing an interactive touch screen interface at automated locker 150. Customer's profile may be obtained by central server 112 from a collection of records of customer online behaviors related to online purchase transition history, search history via the merchant's website, and other sources related to customer preferences or predisposition to purchasing or using an item. For example, platform 110 may collect customer's online behaviors about how many times a customer has searched for particular items. Customer's preference data may include choices that customer 130 has made with respect to preferences or interests (e.g., highly likes, partially likes, dislikes, etc.) regarding one or more items in some categories.

In some example embodiments, automated locker 150 includes a plurality of product storages 151(1)-151(N) defined therein, where N is a positive integer greater than one; a touch screen interface (not shown); processor 153; memory 154 and three-dimensional (3D) point cloud scanner 152. The touch screen interface may be configured to communicate with platform 110 and other computing devices via network 140. Three-dimensional (3D) point cloud scanner 152 may be configured to scan items to be returned or to be stored in a product storage 151(I) for a rent. 3D point cloud scanner 152 may include a scanning module, a processing module, and an output module.

The plurality of product storages 151(1)-151(N) may be configured to securely store a plurality of items purchased by customers or sent by customers from other resources. In an example embodiment, each of the plurality of product storages 151(1)-151(N) may have an individual door or lock and each requested item may be stored and locked in an individual product storage. The plurality of product storages 151(1)-151(N) at automated locker 150 may have different sizes to store items of different volumes or weights.

In some example embodiments, automated locker 150 may also include a conveying module (not shown) comprising a conveyer belt and various mechanical components to secure, lock, load, and release all items stored in the locker. The conveying module is configured to load and release a requested item to and from a product storage. Thus, releasing a requested item may involve unlocking an individual product storage.

Automated locker 150 may also include a touch screen interface; a camera configured to read a verification code, a Quick Response (QR) code or other codes associated with customer 130. Using the automated locker, customers may scan a barcode on their purchase receipt. The requested item may be quickly retrieved on the conveyer belt through a door at the automated locker.

In an example embodiment, one or more processors 153 is configured to be in communication with automated locker's product storages 151(1)-151(N), three-dimensional (3D) point cloud scanner 152, conveying module, touch screen interface, and memory.

Customer 130 may also request, create or generate one or more tasks, transactions or records in central database 111 of platform 110 via central server 112. A unique QR code may be generated for customer 130 via central server 112 to include customer's profile information and may be read or accessed by computing devices in the platform. Customer 130 may also access and update profile information via an application installed in a customer's smartphone or other terminals. A unique QR code or other type of code may be generated for customer 130 via central server 112. The unique QR code may be read or accessed by computing devices (processors) in the interactive touch screen interface for retrieving customer's pending orders. Different customers may accept and add each other as third parties by scanning their QR codes via the application on their smartphones.

In some example embodiments, customer 130 may browse a retail website other than the merchant's website (such as a local electrical store), order items, pay electronically, and request the item to be delivered to rented product storage 151(I) through distribution network 180.

In some example embodiments, customer may place an online order via retailers outside of merchant's platform 170 and distribution network 180 when a requested item is not available at platform 110. The online order can be delivered to product storage 151(I) rented by customer 130 at automated locker 150 via distribution network 180.

The distribution network 180 may communicate with automated locker 150, merchant's physical store 160, retailer outside merchant's platform 170, and merchant's inventory (not shown) via network 140 for delivering items to be stocked or ordered items to be picked up at automated locker 150.

Figure 2:
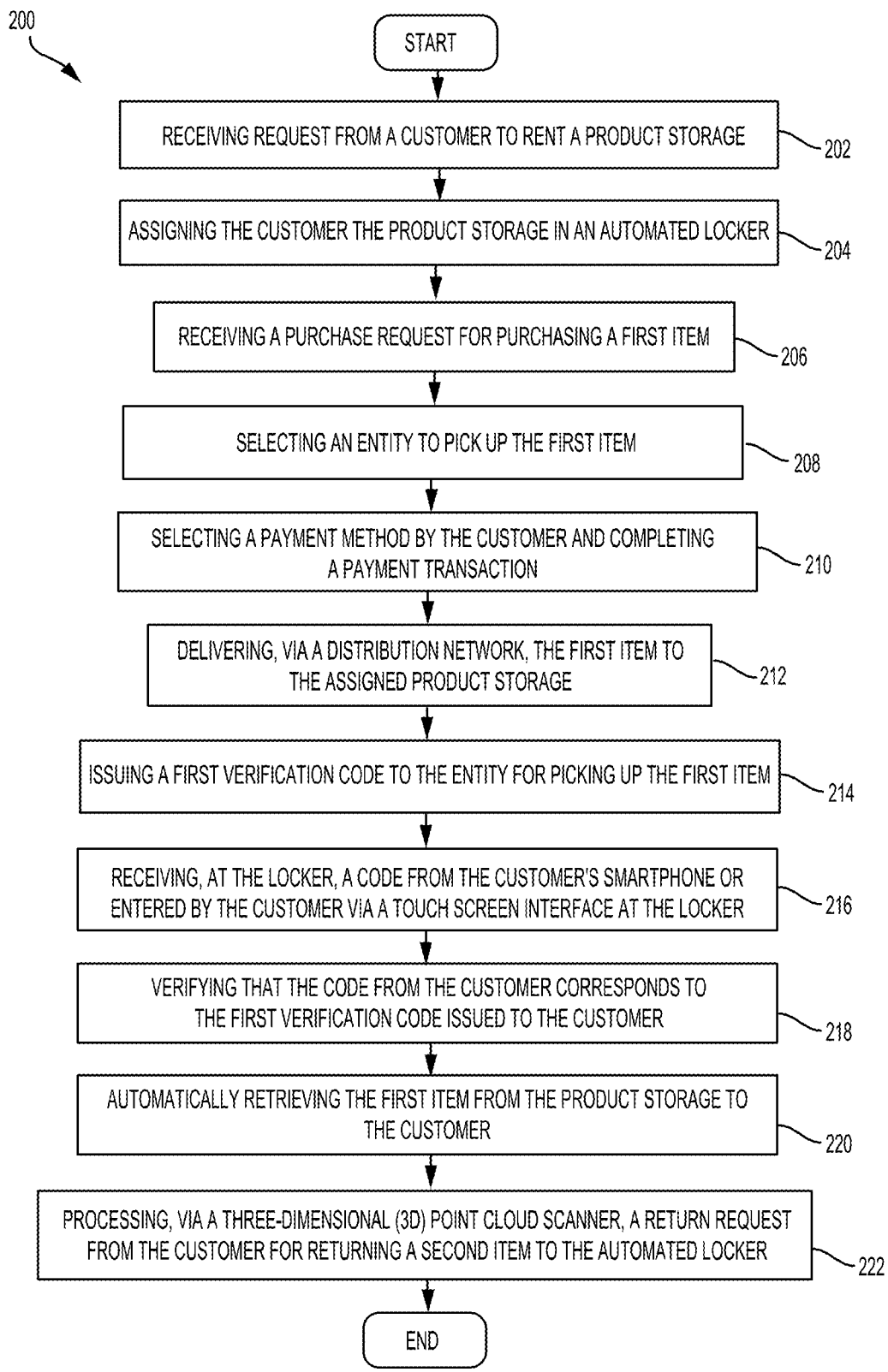
FIG. 2 is a flowchart diagram illustrating a method for storing an item in a customer-owned product storage at an automated locker in accordance to some example embodiments.

FIG. 2 is a flowchart diagram illustrating a method 200 for storing an item in a customer-owned product storage at automated locker 150 in accordance with an example embodiment. The method 200 may be implemented in the above described systems and may include the following steps. Steps may be omitted or combined depending on the steps being performed.

In step 202, a request may be received from customer 130 to rent a product storage 151(I) located in one of a plurality of automated lockers 150 in a platform 110. Each of the plurality of automated lockers 150 may include a plurality of product storages 151(1)-151(N) for storing items.

In step 204, product storage 151(I) of automated locker 150 may be assigned and rented to customer 130 who may select the location of the automated locker from a list of automated lockers via the platform.

In step 206, a purchase request may be received from customer 130 for purchasing a first item via platform 110 or a retailer's website outside the platform using different types of customer terminal 120 via network 140.

In step 208, customer 130 may be asked to select an entity to pick up the first item from selected automated locker 150. For example, the customer may choose to pick up the first item himself or designate a family member or other third party. Customer 130 may purchase the first item as a gift for a family member or friend listed in the customer's profile. The customer may select the family member or friend from the customer's profile to pick up the first item when placing the order via platform 110. If the first item is rented for a third party to pick up, the third party may be required to provide detailed contact information including residential address, phone number, email address, etc.

In step 210, customer 130 may be asked to select a payment method and to confirm a payment transaction. The payment method may be selected based on the payment account information in the customer's profile. The payment transaction may be one of a credit card transaction, debit card transaction and a blockchain payment transaction.

In step 212, the first item may be delivered, via a distribution network, to the assigned product storage of the selected automated locker.

In step 214, a first verification code may be issued to the entity for picking up the first item. The entity may receive an e-mail or text message from platform 110 that an item is waiting for them at automated locker 150. The email or text message may include the unique first verification code for the entity to pick up the item.

In step 216, upon arriving at selected automated locker 150, the entity may enter a code via a touch screen interface or a camera may scan the code.

In step 218, the code from the entity may be verified to correspond to the first verification code issued to the customer. In an example embodiment, automated locker 150 may read the entity's QR code associated with the entity's profile via an application installed in the entity's smartphone. The entity's QR code may include the entity's pending purchase or task related to the first item to be delivered.

In step 220, the first item may be automatically retrieved from the assigned product storage to the customer via the conveying module of automated locker 150.

In step 222, platform 100 may receive a request from customer 130 for returning a second item via a three-dimensional (3D) point cloud scanner of selected automated locker 150.

In some example embodiments, the method 200 may further include issuing the first verification code to customer 130 via platform 110 when customer 130 decides to pick up the first item. When customer 130 decides to ask a third party listed in the customer's profile to pick up the first item, the method 200 may further include issuing the first verification code to the third party via the platform. The third party may be one of customer 130's family members, friends, or neighbors associated with customer's profile. The first verification code is used to identify an authority to retrieve and pick up the first item from the automated locker by the entity. For example, the customer 130 is out of town but still wants to send a birthday gift to his or her grandmother. Customer 130 may purchase a gift via platform 110 and select one of his family members associated to customer's profile to pick it up and help to send it to his grandmother. Platform 110 may send a verification code to the selected third party. Customer 130 may also receive and send the verification code directly to a third party for picking up items from product storage 151(I).

In some example embodiments, a blockchain payment transaction between customer 130 and platform 110 may be conducted to transfer digital currency via a blockchain payment network communicated with locker payment system via network 140.

Figure 3:
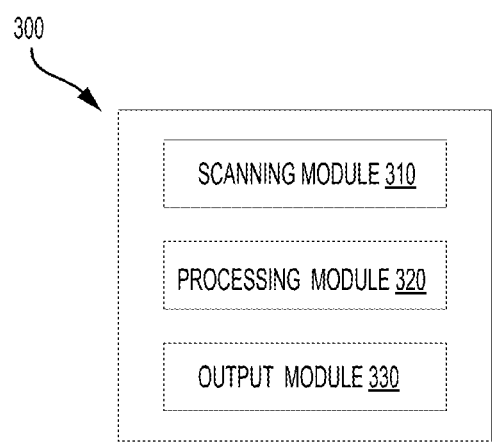
FIG. 3 is a block diagram illustrating a three-dimensional (3D) point cloud scanner in accordance to some example embodiments.

FIG. 3 is a block diagram illustrating a three-dimensional (3D) point cloud scanner 300 in accordance to some example embodiments. Three-dimensional (3D) point cloud scanner 300 may be configured to scan items to be returned or requested to be stored in customer 130's product storage. 3D point cloud scanner 300 measures a large number of points on an item's surface and often outputs a point cloud as a data file. The point cloud represents the set of points that the scanner has measured. Point clouds are usually converted to polygon mesh or triangle mesh models, NURBS surface models, or CAD models through a process commonly referred to as surface reconstruction.

In some example endowments, 3D point cloud scanner 300 may include a scanning module 310, a processing module 320, and an output module 330. The scanning module may perform a plurality of scans of the returned item from different directions to create point clouds of a plurality of scanned images. The processing module may analyze a set of point cloud data of the scanned images and convert the point cloud data to polygon mesh or triangle mesh models, Computer-Aided Design (CAD) models, or other surface models through a surface reconstruction process. The set of point cloud data of the scanned images may include the second item's Universal Product Code (UPC) code, QR code or other codes, dimensions, weight, shape, color, and assembled status. The output module may output the scanned information to processor 153.

Processor 153 may verify the purchase record of the second item by communicating with central server 112 via network 140 based on the output information from the 3D point cloud scanner 300 to determine a status of the second item.

Figure 4:
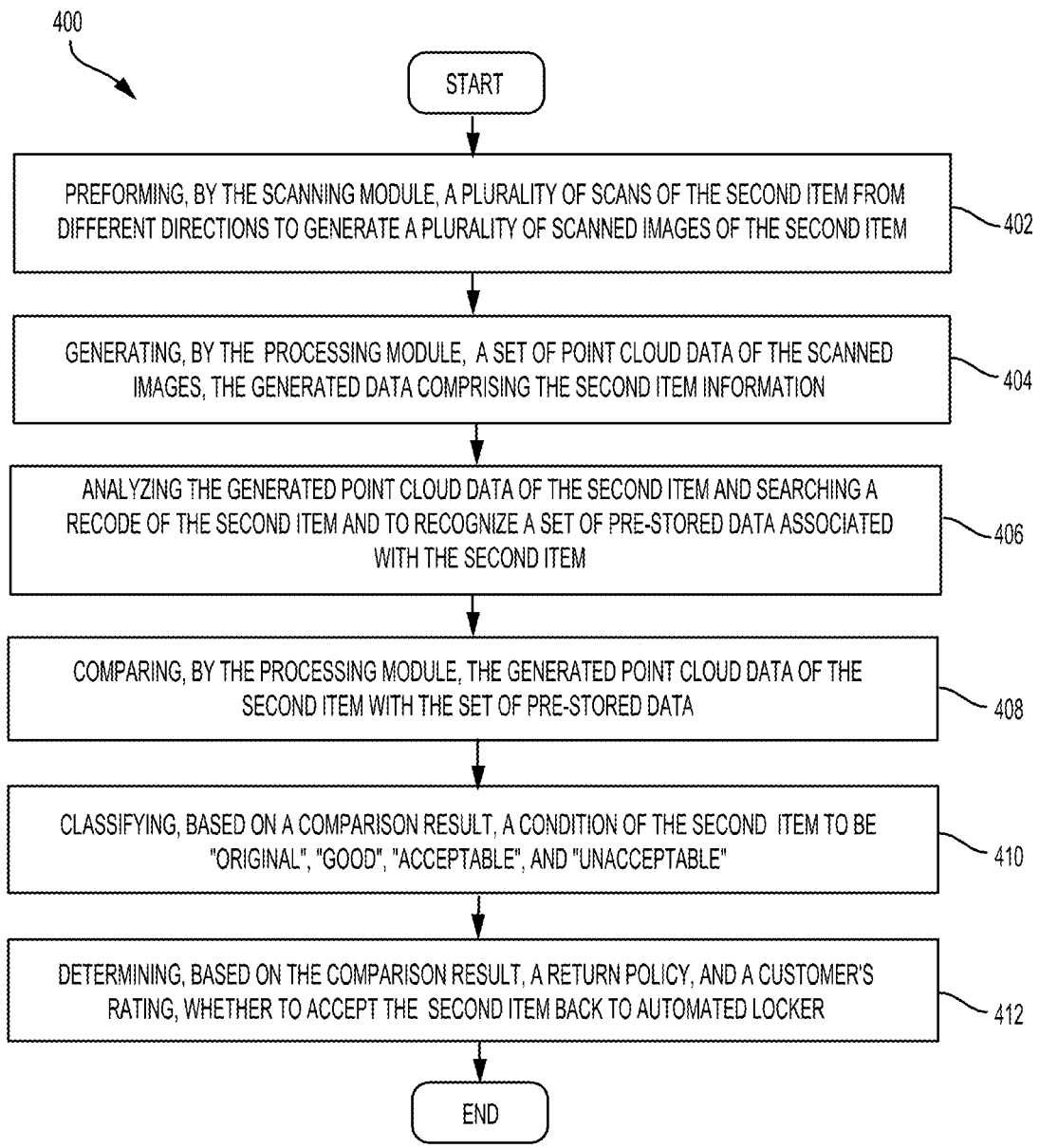
FIG. 4 is a flowchart diagram illustrating a method for processing a return request in accordance to some example embodiments.

FIG. 4 is a flowchart diagram illustrating an example process 400 for processing a return request via 3D point cloud scanner 300 in accordance to some example embodiments. The process may also be used when a rented item is returned.

In step 402, the scanning module 310 may be configured to perform a plurality of scans of the second item (e.g., a return item) from different directions to generate a plurality of scanned images of the second item.

In step 404, a set of point cloud data of the scanned images may be generated via the processing module 320. The generated data may include the second item's product code information, dimensions, weight, shape, color, and assembled status. These scanned codes and features may be used to identify the second item via platform 110. Thus, platform 110 may list the item purchase or rental history and status based on the scanned result.

In step 406, the generated point cloud data of the second item may be analyzed via the processing module 320. A recode of the second item may be searched to recognize a set of pre-stored data associated with the second item via the platform. The pre-stored data may be the status of the second item before it is rented or sold.

In step 408, the generated point cloud data of the second item is compared with the set of pre-stored data via the processing module 320.

In step 410, a condition of the second item may be identified by the processing module 320, based on a comparison result of step 408 to be "original", "good", "acceptable", and "unacceptable".

In step 412, the method 400 may determine by the output module 330 whether to accept the second item back to automated locker 150, based on the condition of the second item, a return policy, and a customer's rating. Customer's rating is dynamically analyzed and valuated by processors via platform 110, based on the customer's purchase or rental history and the status of returned items associated with the corresponding purchase or rental.

In some example embodiments, the method 400 may further include analyzing, by the processing module 320, the generated point cloud data of the second item to construct a digital 3D model.

In some example embodiments, the method 400 may further include issuing, via the platform, based on an original price of the second item, a deposit refund to the customer's payment account used to purchase the second item, when the condition of the second item is identified to be "original", "good", or "acceptable" and the customer confirms returning of the second item. For example, if the second item is recently purchased by the customer and the package has been opened, the condition of the second item may be identified as "original". Platform 100 may issue a deposit refund to the customer's payment account used to purchase the second item.

In some example embodiments, the method 400 may further include discontinuing the customer's use of the product storage, and directing the customer to bring the purchased item to a local store associated with the locker transaction system, when the condition of the second item is identified to be "unacceptable" or based on the type of products. For example, if customer 130 returns a table with only 3 legs instead of 4 legs, the 3D scanner may compare the scanned data with an original table associated with the returned table. The 3D scanner may identify the returned table to be "unacceptable" and direct the customer to bring the purchased table to a local store associated with the platform.

In some example embodiments, the product code may be at least one of UPC code, a QR code or other codes associated with the product information saved in the central database.

In some example embodiments, the method 400 may further include using a second verification code to identify the second item returned by customer 130. When customer 130 returns the second item to automated locker 150, automated locker 150 may read the second verification code issued to customer 130. The second verification code may be shown in a purchase confirmation receipt sent to the customer. Automated locker 150 may also read the UPC code printed on a side or bottom of the second item to identify the purchase record along with the analyzed result by 3D point cloud scanner 300.

In some example embodiments, customer 130 may have a personal item to be stored in product storage 151(I) at automated locker 150. Customer 130 may be required to enter the personal item's general descriptions via the touch screen interface of automated locker 150. 3D point cloud scanner may also scan and generate a set of point cloud data of the personal item which can be stored in the central database and associated with the customer's profile. When automated locker 150 accepts the personal item, a verification code may be issued for customer 130 to retrieve the personal item via platform 110. Automated locker 150 may print out a bar code for the personal item to be attached on side or bottom of the personal item.

In some example embodiments, customer 130 may have a stored item at product storage 151(I) for sale or for rent to a third party.

Figure 5:
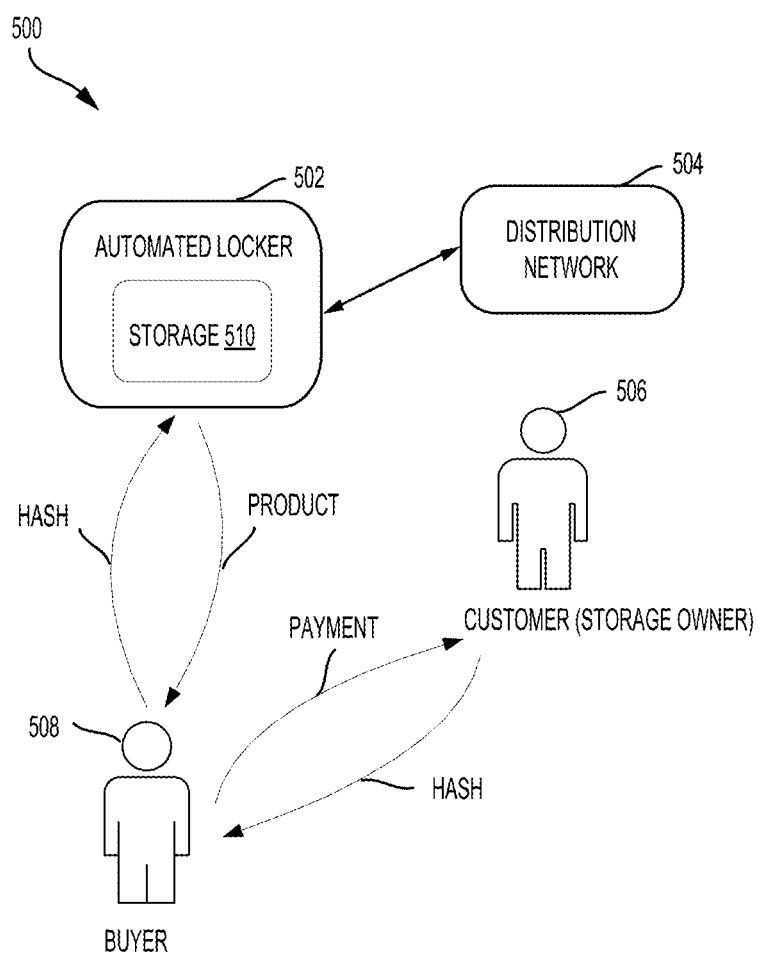
FIG. 5 is a diagram illustrating a method for a third party to purchase and pick up an item from a customer's product storage in accordance to some example embodiments.

FIG. 5 is a diagram illustrating a method for a third party to purchase and pick up an item stored in customer's product storage 510 in accordance to an example embodiment.

As shown in FIG. 5, customer (e.g. storage owner) 506 purchases an item (e.g. product) which is delivered by distribution network 504 and stored in product storage 510 at locker 502. The customer 506 receives a hash code or verification code to access product storage 510 via platform 110. For example, customer 506 may want to sell the item and post the item for sale with the price on a marketplace. A buyer 508 is a third party who accepts the offer to buy the customer's item. Customer 506 can directly accept cash-in-hand from buyer 508. Buyer 508 may also make a blockchain payment transaction or other type of mobile payment based on digital currency with customer 506. Once the payment transaction from buyer 508 to customer 506 is completed, customer 506 may send a message or an email including a hash or verification code and the location of locker 502 to buyer 508. The hash code or verification code in FIG. 5 may be a QR code issued by the platform. Buyer 508 carrying a smartphone can present the hash code, verification code, the QR code, etc., for the locker to release the item stored in the product storage 510.

Figure 6:
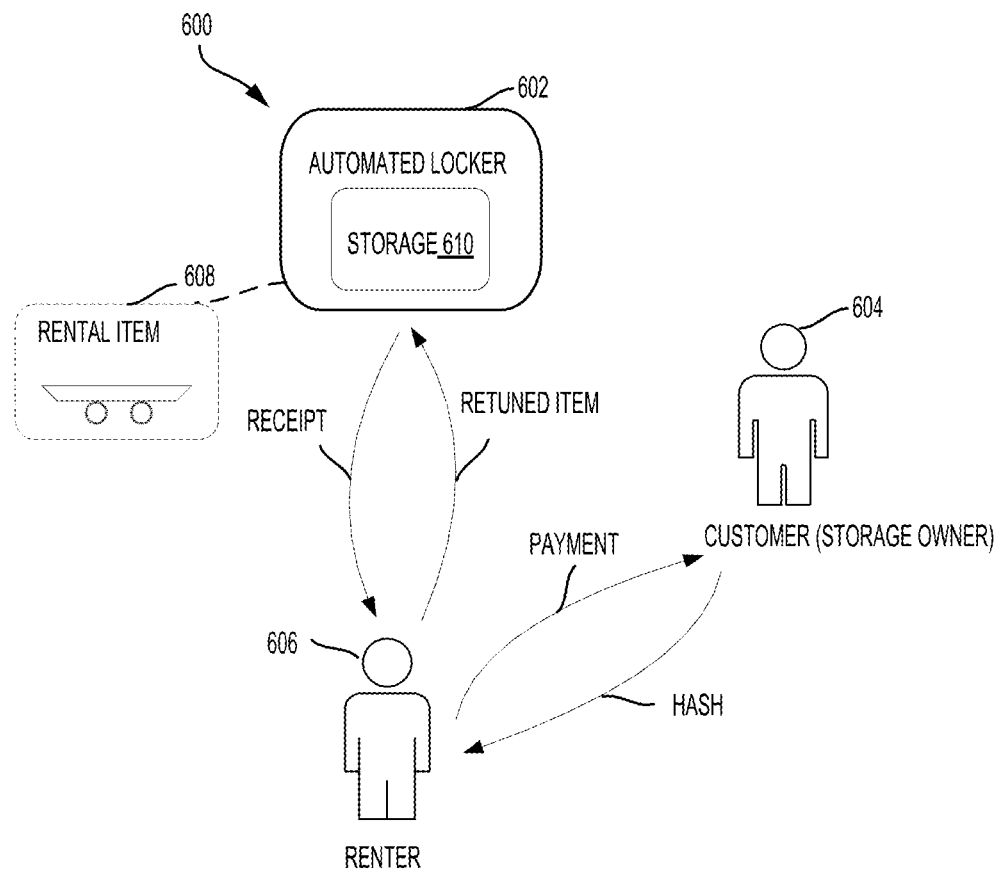
FIG. 6 is a diagram illustrating a process for a rental use of the customer's product storage at an automated locker in accordance to some example embodiments.

FIG. 6 is a diagram illustrating a process 600 for rental use of customer's product storage 610 at automated locker 602 in accordance to an example embodiment.

As shown in FIG. 6, customer (e.g. storage owner) 604 stores an item, such as a skateboard 608 in product storage 610 at locker 602 located, for example in a skate park. Storage owner 604 receives a hash code or verification code to access product storage 610 via platform 110. For example, customer 604 may want to rent a skateboard to a third party (renter) 606. Customer 604 may post the item for rent with a rental price set during a pre-determined period time on a marketplace. Renter 606 is a third party who is registered and fills out a customer's profile at platform 110. Renter 606 may follow steps of process 500 to rent and retrieve the skateboard 608 from locker 602. Hash may also be provided directly to renter 606 upon payment. Upon returning the skateboard 608 back to locker 602, automated locker 602 may use 3D point cloud scanner to identify, based on steps of process 400, a condition of the skateboard 608. The condition of the skateboard 608 may be identified to determine whether it has the same condition as it was rented.

When the condition of returned skateboard 608 is identified to be "original", "good", or "acceptable", platform 110 may accept skateboard 608 back to product storage 610. When the condition of returned skateboard 608 is identified to be "unacceptable" or skateboard 608 is not returned within the pre-determined period, platform 110 may charge for damage or non-return from renter 606's payment account saved in the renter's profile.

Figure 7:
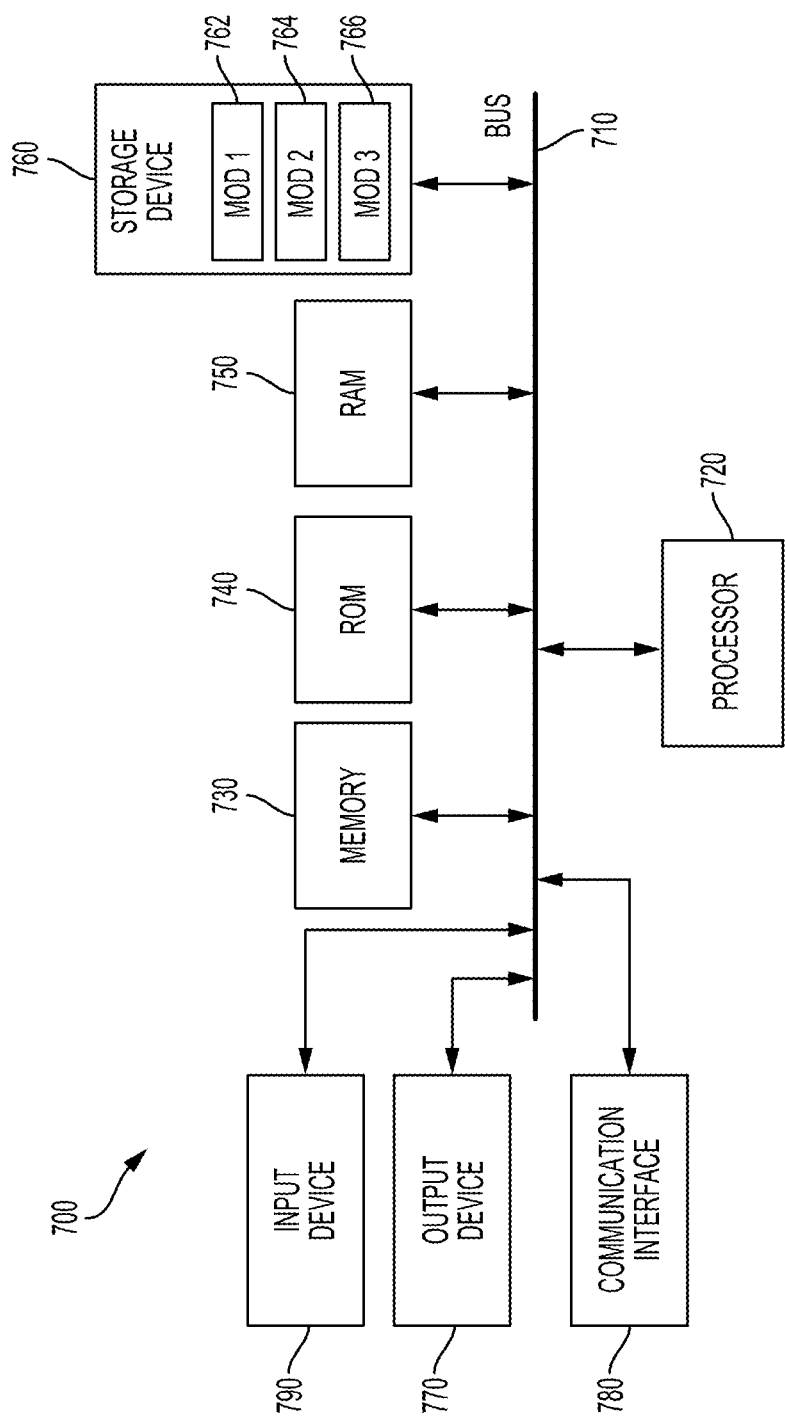
FIG. 7 is a block diagram illustrating an example computer system in which some example embodiments may be implemented.

FIG. 7 illustrates an example computer system 700 which can be used to perform the processes for storing items in customer-owned product storages at an automated locker as disclosed herein.

With reference to FIG. 7, an example system 700 can include a processing unit (CPU or processor) 720 and a system bus 710 that couples various system components including the system memory 730 such as read only memory (ROM) 740 and random access memory (RAM) 750 to the processor 720. The system 700 can include a cache of high speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, output device 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the example embodiment described herein employs the hard disk 760, other types of computer-readable media which can store data that are accessible by a computer, such as magnetic cassettes, flash memory cards, digital versatile disks, cartridges, random access memories (RAMs) 750, and read-only memory (ROM) 740, may also be used in the example operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. An automated locker, comprising:
    a plurality of storage areas, the storage areas including an interior for receiving an item and a closure system for securely opening and closing access to the interior;
    a three-dimensional (3D) point cloud scanner, comprising a scanning module, a processing module, and an output module;
    a controller to provide control signals to the closure system to lock and unlock;
    a processor; and
    a non-transitory computer-readable storage medium having instructions stored which, when executed by the processor, cause the processor to perform operations comprising:
    receiving, via a processor, a request from a customer to access one of the storage areas;

assigning, by the processor, to the customer, based on a customer's profile, a product storage, the automated locker being selected by the customer;
selecting, via the processor, a payment method and confirming a payment transaction, the payment method being one of a credit card transaction, debit card transaction or a blockchain payment transaction;
providing a verification code for access the product storage to the customer;
receiving, at the locker, the code from the customer's smart phone or entered via a touch screen interface at the locker;
verifying, via the processor, at the locker, that the code from the customer corresponds to the verification code issued to the customer;
unlocking the product storage and receiving an item therein;
determining that the product storage has been opened, and subsequently closed;
performing, by the scanning module, a plurality of scans of the item from different directions to generate a plurality of scanned images of the item;
generating, by the processing module, a set of point cloud data of the scanned images, the generated data comprising the second item information including at least one of product code information, dimensions, weight, shape, color, and assembled status,
analyzing, by the processing module, the generated point cloud data of the item and searching a record of the item to recognize a set of pre-stored data associated with the item via the platform;
comparing, by the processing module, the generated point cloud data of the item with the set of pre-stored data;
identifying, by the processing module, based on a comparison result, a condition of the second item;
determining, by an output module, based on the condition of the second item, the purchase recode of the item, a return policy, and a customer's rating, whether to accept the item.

2. The system of claim 1, further comprising:
receiving a purchase order specifying delivery at the storage locker;
delivering, via a distribution network, the ordered item to the assigned product storage;
issuing, via the platform, a first confirmation code to for picking up the first item;
receiving, at the locker, the code from the customer's smart phone or entered by the customer via a touch screen interface at the locker;
verifying, via the processor, at the locker, that the code from the customer corresponds to the verification code issued to the customer;
unlocking the product storage;
automatically retrieving the first item from the product storage.

3. The system of claim 1, wherein the condition is one of "original", "good", "acceptable", and "unacceptable".

4. The system of claim 1, further comprising:
constructing, by the processing module, a digital 3D model associated with the item.

5. The system of claim 1, wherein, when the condition of the item is identified to be "original", "good", or "acceptable" and the customer confirms returning the item, a deposit refund is issued to the customer's payment account used for purchasing the item.

6. The system of claim 1, wherein, when the condition of the item is identified to be "unacceptable",
discontinuing the customer's use of the product storage; and
directing the customer to bring the purchased item to a local store associated with the platform.

7. The system of claim 2, further comprising:
issuing the first verification code to the customer when the customer decides pick up the first item; and
issuing the verification code to a third party when the customer decides to ask the third party listed in the customer's profile to pick up the first item.

8. The system of claim 1, further comprising:
receiving a third item at the automated locker for storing in the assigned product storage,
the 3D point cloud scanner scans and generates a set of point cloud data of the third item which is stored in the central database and associated with the customer's profile; and a third verification code is issued, via the platform, for the customer to retrieve the third item.

9. The system of claim 1, wherein a blockchain payment transaction is conducted between customer and the third party when both of them have blockchain accounts associated with blockchain payment networks.

10. A method, comprising:
receiving, via a processor at a platform, a request from a customer to rent a product storage located in one of a plurality of automated lockers of the platform, each of the plurality of automated lockers comprising a plurality of product storages;
assigning, by the processor, to the customer, based on a customer's profile, a product storage in an automated locker, the automated locker being selected by the customer;
receiving, via the processor, a purchase request from the customer for purchasing a first item from the platform or from a retailer's website outside the platform;
selecting, via the processor, an entity to pick up the first item from the automated locker;
selecting, via the processor, a payment method and confirming a payment transaction, the payment method being one of a credit card transaction, debit card transaction and a blockchain payment transaction;
delivering, via a distribution network, the first item to the assigned product storage;
issuing, via the platform, a first verification code to the entity for picking up the first item;
receiving, at the locker, a code from the customer's smart phone or entered by the customer via a touch screen interface at the locker;
verifying, via the processor, at the locker, that the code from the customer corresponds to the first verification code issued to the customer;
automatically retrieving the first item from the product storage to the customer; and
processing, via a three-dimensional (3D) point cloud scanner, a return request from the customer for returning a second item to the assigned product storage, the 3D point cloud scanner comprising a scanning module, a processing module, and an output module.

11. The method of claim 10, wherein processing the return request further comprises:
preforming, by the scanning module, a plurality of scans of the second item from different directions to generate a plurality of scanned images of the second item;
generating, by the processing module, a set of point cloud data of the scanned images, the generated data comprising the second item information including product code information, dimensions, weight, shape, color, and assembled status, analyzing, by the processing module, the generated point cloud data of the second item and searching a purchase recode of the second item to recognize a set of pre-stored data associated with the second item via the platform;

comparing, by the processing module, the generated point cloud data of the second item with the set of pre-stored data;

identifying, by the processing module, based on a comparison result, a condition of the second item to be "original", "good", "acceptable", and "unacceptable";

determining, by an output module, based on the condition of the second item, purchase recode of the second item, a return policy, and a customer's rating, whether to accept the second item back to the automated locker.

12. The method of claim 11, wherein, when the condition of the second item is identified to be "original", "good", or "acceptable" and the customer confirms returning the second item, a deposit refund is issued to the customer's payment account used for purchasing the item.

13. The method of claim 11, wherein, when the condition of the second item is identified to be "unacceptable",
discontinuing the customer's use of the product storage; and
directing the customer to bring the purchased item to a local store associated with the platform.

14. The method of claim 11, wherein the product code information comprises at least one of Universal Product Code (UPC) code, Quick Response (QR) code or other codes associated with the product information saved in the central database.

15. The method of claim 11, further comprises:
when the customer decides pick up the first item, issuing the first verification code to the customer via the platform; and
when the customer decides to ask a third party listed in the customer's profile to pick up the first item, issuing the first verification code to the third party via the platform.

16. The method of claim 11, wherein a second verification code is used to identify the second item returned by the customer.

17. The method of claim 10, further comprising:
when the customer delivers a third item to the automated locker for storing in the assigned product storage,
the 3D point cloud scanner scans and generates a set of point cloud data of the third item which is stored in the central database and associated with the customer's profile; and a third verification code is issued, via the platform, for the customer to retrieve the third item.

18. The method of claim 10, wherein a blockchain payment transaction is conducted between customer and the third party when both of them have blockchain accounts associated with blockchain payment networks.

19. A non-transitory computer-readable storage medium having instructions stored which, when executed by a computing device, cause the computing device to perform operations comprising:
receiving, via a processor at a platform, a request from a customer to rent a product storage located in one of a plurality of automated lockers of the platform, each of the plurality of automated lockers comprising a plurality of product storages;

assigning, by the processor, to the customer, based on a customer's profile, a product storage in an automated locker, the automated locker being selected by the customer;

receiving, via the processor, a purchase request from the customer for purchasing a first item from the platform or from a retailer's website outside the platform;

selecting, via the processor, an entity to pick up the first item from the automated locker;

selecting, via the processor, a payment method and confirming a payment transaction, the payment method being one of a credit card transaction, debit card transaction and a blockchain payment transaction;

delivering, via a distribution network, the first item to the assigned product storage;

issuing, via the platform, a first verification code to the entity for picking up the first item;

receiving, at the locker, a code from the customer's smart phone or entered by the customer via a touch screen interface at the locker;

verifying, via the processor, at the locker, that the code from the customer corresponds to the first verification code issued to the customer;

automatically retrieving the first item from the product storage to the customer; and processing, via a three-dimensional (3D) point cloud scanner, a return request from the customer for returning a second item to the assigned product storage, the 3D point cloud scanner comprising a scanning module, a processing module, and an output module.

20. The non-transitory computer-readable storage medium of claim 19, wherein processing the return request further comprises:
preforming, by the scanning module, a plurality of scans of the second item from different directions to generate a plurality of scanned images of the second item;

generating, by the processing module, a set of point cloud data of the scanned images, the generated data comprising the second item information including product code information, dimensions, weight, shape, color, and assembled status, analyzing, by the processing module, the generated point cloud data of the second item and searching a purchase recode of the second item to recognize a set of pre-stored data associated with the second item via the platform;

comparing, by the processing module, the generated point cloud data of the second item with the set of pre-stored data;

identifying, by the processing module, based on a comparison result, a condition of the second item to be "original", "good", "acceptable", and "unacceptable";

determining, by an output module, based on the condition of the second item, purchase recode of the second item, a return policy, and a customer's rating, whether to accept the second item back to the automated locker.

* * * * *